United States Patent
Yamamoto

(10) Patent No.: US 6,795,266 B2
(45) Date of Patent: Sep. 21, 2004

(54) MAGNETIC DISC DRIVE

(75) Inventor: Masaki Yamamoto, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 340 days.

(21) Appl. No.: 09/979,994

(22) PCT Filed: Mar. 30, 2001

(86) PCT No.: PCT/JP01/02732

§ 371 (c)(1),
(2), (4) Date: Jan. 28, 2002

(87) PCT Pub. No.: WO01/73787

PCT Pub. Date: Oct. 4, 2001

(65) Prior Publication Data

US 2002/0186493 A1 Dec. 12, 2002

(30) Foreign Application Priority Data

Mar. 31, 2000 (JP) .......................................... 2000-99038

(51) Int. Cl.$^7$ ............................................. G11B 5/596
(52) U.S. Cl. ................................................... 360/77.06
(58) Field of Search ...................................... 360/77.06

(56) References Cited

U.S. PATENT DOCUMENTS

| | | |
|---|---|---|
| 4,204,234 A | 5/1980 | Noble |
| 4,935,835 A | 6/1990 | Godwin et al. |
| 5,227,931 A | 7/1993 | Misumi |
| 5,739,971 A | 4/1998 | Yamaki et al. |

FOREIGN PATENT DOCUMENTS

| | | |
|---|---|---|
| DE | 2963621 | 10/1982 |
| DE | 68920821D | 3/1995 |
| EP | 0010664 A1 | 5/1980 |
| EP | 0010664 B1 | 9/1982 |
| EP | 0368269 A2 | 5/1990 |
| EP | 0368269 B1 | 1/1995 |
| EP | 68920821 T | 5/1995 |
| JP | 55-058854 | 5/1980 |
| JP | 59-142786 | 8/1984 |
| JP | 60-87477 | 5/1985 |
| JP | 61-013308 | 1/1986 |
| JP | 61-199279 | 9/1986 |
| JP | 64-17216 | 1/1989 |
| JP | 1-107381 | 4/1989 |
| JP | 2-122485 | 5/1990 |
| JP | 2-187969 | 7/1990 |
| JP | 4-102277 | 4/1992 |
| JP | 5-274827 | 10/1993 |
| JP | 5-274830 | 10/1993 |
| JP | 2532687 | 9/1996 |
| JP | 2692902 | 12/1997 |

Primary Examiner—David Hudspeth
Assistant Examiner—Mitchell Slavitt
(74) Attorney, Agent, or Firm—Wenderoth, Lind & Ponack, L.L.P.

(57) ABSTRACT

A disk-shaped magnetic recording medium having a reference track and a plurality of data tracks is rotated by a motor which generates an index signal at a predetermined position. A magnetic head is slightly moved in the radial direction of the medium for each predetermined unit distance smaller than the data track width, and a reproduction output amplitude measuring circuit measures the reproduction output amplitude of a signal read from the data track for each index signal. A CPU obtains a position where the amplitude has the maximum value based on the number of head movements and the amplitude at that time so as to control data track positioning. Further, the CPU calculates a relative position between the data track position and the reference track position to perform reference track positioning. The data or reference track positioning of the magnetic head can be performed accurately in a short time.

8 Claims, 5 Drawing Sheets

MAGNETIC DISC DRIVE

TECHNICAL FIELD

The present invention relates to a magnetic disk unit which records and reproduces data in/from a disk-shaped magnetic recording medium by employing a magnetic head and, more particularly, to a magnetic disk unit which performs positioning of the magnetic head in a short amount of time.

BACKGROUND ART

A disk-shaped magnetic recording medium generally has a reference track provided in its innermost circumference and data tracks formed outside the reference track toward the outer circumference of the disk. Data are written in or read from the data tracks by a magnetic head which moves perpendicularly to the circumference direction of the magnetic recording medium. Further, there is a disk-shaped magnetic recording medium on which an optical groove is formed adjoining to each data track. In this case, the magnetic disk unit moves the magnetic head and sets the magnetic head on a track on the basis of the optical groove to thereby read or write data from/in the data track by the magnetic head. The optical groove as a reference for a set-on-track and the data track are usually located apart from each other by several tens of tracks.

To make it possible to exchange such disk-shaped magnetic recording medium among plural magnetic disk units, positioning of the magnetic head should be performed. When the disk-shaped magnetic recording medium has a high track density, accuracy is required for the positioning of the magnetic head.

A conventional method of positioning a magnetic head in a magnetic disk unit as described above is disclosed in Japanese Published Patent Application No. Hei. 2-187969, which discloses that every time a disk-shaped magnetic recording medium is set in the magnetic disk unit, the magnetic disk unit moves the magnetic head to a reference track provided on each disk-shaped magnetic recording medium as an initial operation, and sets an absolute track-zero position from the reference track, thereby performing accurate positioning of the magnetic head.

However, to move the magnetic head to the reference track by the conventional magnetic head positioning method, an operation of performing coarse adjustment which roughly moves the magnetic head to the reference track at the innermost circumference of the recording medium and then performing fine adjustment which slightly moves the magnetic head in the vicinity of the reference track is required. Further, since the conventional magnetic disk unit has an error in a write position of the reference track on the recording medium, an error caused by the accuracy of the coarse adjustment, and an error in a position of the magnetic head with respect to an optical servo due to temperature expansion, a positional range of reference track detection that is performed at the fine adjustment of the magnetic head must be set widely from several tracks to several tens of tracks, which results in a long period of time to position the magnetic head.

The present invention is made to solve the above-mentioned problems. The object of the present invention is therefore to provide a magnetic disk unit which can perform positioning of a magnetic head in a short time.

SUMMARY OF THE INVENTION

According to a first aspect of the present invention, there is provided a magnetic disk unit which rotates a disks-shaped magnetic recording medium having a reference track and plural data tracks with a motor, which generates an index signal at a predetermined position, and records or reproduces data by employing a magnetic head. The magnetic disk unit of the first aspect comprises a head moving means (unit) for slightly moving the magnetic head in the direction of the radius of the disk-shaped magnetic recording medium in a predetermined unit of a distance that is shorter than the data track width. The magnetic disk unit also comprises a reproduction output amplitude measuring means (unit) for measuring the reproduction output amplitude of a signal that is read from a data track by the magnetic head each time the index signal is generated. The magnetic disk unit further comprises a CPU which obtains a position where the reproduction output amplitude has the maximum value based on the reproduction output amplitude measured by the reproduction output amplitude measuring means and the number of head movements of the magnetic head as moved by the head moving means so as to perform control of data track positioning of the magnetic head on the data track.

Therefore, data track positioning of the magnetic head in each data track on the disk-shaped magnetic recording medium having a reference track and plural data tracks can be performed accurately in a short amount of time.

According to a second aspect of the present invention, there is provided a magnetic disk unit which rotates a disk-shaped magnetic recording medium having a reference track, plural data tracks, and optical grooves sandwiched between the respective data tracks with a motor, which generates an index signal at a predetermined position, and which records or reproduces data by employing a magnetic head. The magnetic disk unit of the second aspect comprises a head moving means (unit) for slightly moving the magnetic head in the direction of the radius of the disk-shaped magnetic recording medium in a predetermined unit of a distance that is shorter than the data track width. The magnetic disk unit of the second aspect also comprises a reproduction output amplitude measuring means (unit) for measuring the reproduction output amplitude of a signal that is read from a data track by the magnetic head each time the index signal is generated. The magnetic disk unit of the second aspect further comprises a CPU which obtains a position where the reproduction output amplitude has the maximum value based on the reproduction output amplitude that is measured by the reproduction output amplitude measuring means and the number of head movements of the magnetic head as moved by the head moving means so as to perform control of data track positioning of the magnetic head on the data track.

Therefore, data track positioning of the magnetic head in each data track on the disk-shaped magnetic recording medium having a reference track, plural data tracks, and optical grooves sandwiched between the respective data tracks can be performed accurately in a short amount of time.

According to a third aspect of the present invention, in accordance with the magnetic disk unit of the first and second aspects, there is further provided a track position detecting means (unit) for detecting the data track position from the signal that is read from the data track by the magnetic head. Further, according to the third aspect the CPU calculates a relative positional difference between the data track position that is detected by the track position detecting means and the reference track position, and performs control of reference track positioning of the magnetic head on the basis of the calculation result.

Therefore, accurate movement is possible for coarse adjustment in reference track positioning of the magnetic head, whereby the positional range of reference track detection at fine adjustment is narrowed, thereby resulting in a short-time and accurate reference track positioning.

According to a fourth aspect of the present invention, in accordance with the magnetic disk unit of the first or second aspects, the data track positioning control by the CPU holds the head moving cycle number, the value of the reproduction output amplitude which is measured by the reproduction output amplitude measuring means at the head moving cycle number each time the index signal is generated, and the maximum reproduction output amplitude cycle number which is the moving cycle number having a larger reproduction output amplitude when compared between the measured reproduction output amplitude and the reproduction output amplitude at the immediately previous moving cycle number. After performing processing corresponding to a predetermined number of moving cycle numbers by the CPU, a position of the maximum reproduction output amplitude on the data track is obtained on the basis of the maximum reproduction output amplitude cycle number, and the obtained position is set as a data track position of the magnetic head on the data track.

Therefore, data track positioning of the magnetic head can be performed accurately in a short amount of time so as to reproduce data from the data track without performing reference track positioning.

According to a fifth aspect of the present invention, in accordance with the magnetic disk unit of the fourth aspect, there is further provided a track position detecting means (unit) for detecting the data track position from the signal that is read from the data track by the magnetic head. Further, according to the fifth aspect, the CPU calculates a relative positional difference between the data track position that is detected by the track position detecting means and the reference track position, and performs a control of reference track positioning of the magnetic head on the basis of the calculation result.

Therefore, data track positioning of the magnetic head is performed in a short amount of time so as to reproduce data from the data track without performing reference track positioning and, further, accurate movement is possible for coarse adjustment in reference track positioning of the magnetic head, whereby the positional range of reference track detection at fine adjustment is narrowed, thereby resulting in a short-time and accurate reference track positioning.

BRIEF DESCRIPTION OF THE DRAWINGS

FIG. 2(b) is a diagram illustrating a reproduction output amplitude for each movement of the magnetic head when the magnetic head slightly moves on the data tracks in the direction of the radius of the disk-shaped magnetic recording medium.

DETAILED DESCRIPTION OF THE INVENTION

First Embodiment

Hereinafter, the positioning of a magnetic head of a magnetic disk unit according to a first embodiment of the present invention will be described with reference to FIGS. 1 to 3. In the first embodiment, data track positioning in each data track on a disk-shaped magnetic recording medium will be described.

Figure 1:
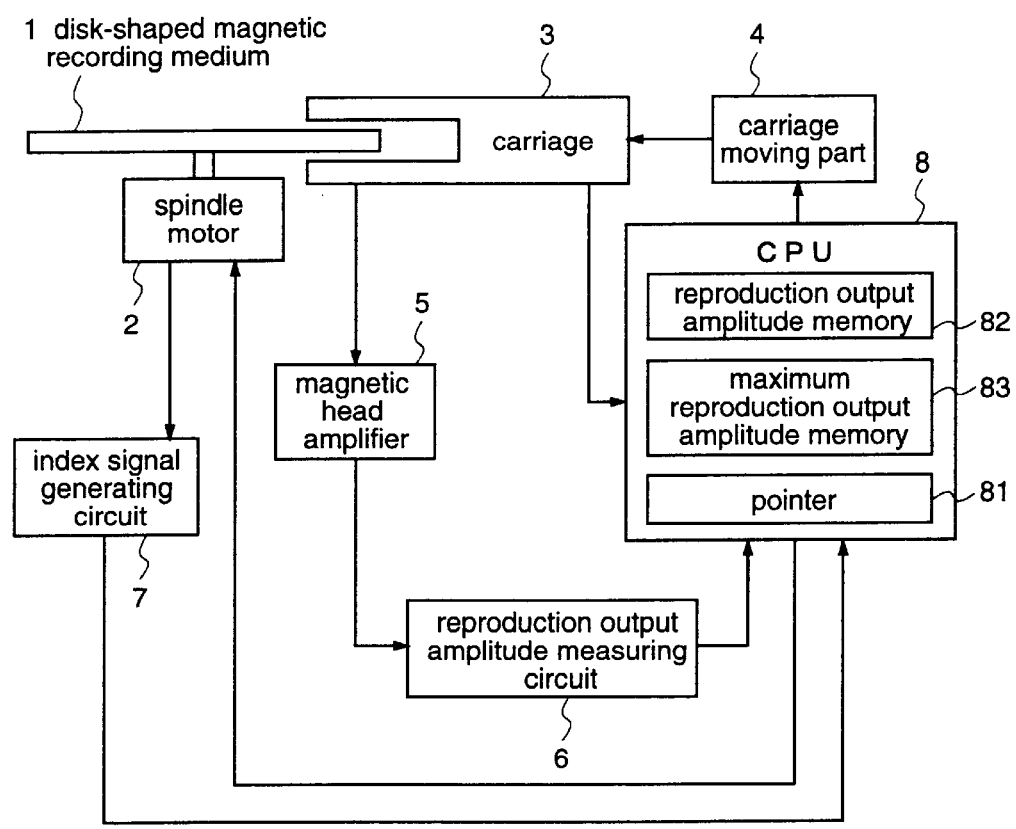
FIG. 1 is a diagram illustrating the constitution of a magnetic disk unit according to a first embodiment of the present invention.

FIG. 1 is a diagram illustrating the constitution of the magnetic disk unit according to the first embodiment of the present invention. The first embodiment will be described based on the assumption that the disk-shaped magnetic recording medium has optical grooves and that the magnetic disk unit performs a servo operation by an optical laser.

In FIG. 1, the magnetic disk unit according to the first embodiment comprises a disk-shaped magnetic recording medium 1 having a reference track, plural data tracks, and optical grooves that are sandwiched between the respective data tracks. The magnetic disk unit of the first embodiment also comprises a spindle motor 2 for rotating the disk-shaped magnetic recording medium 1, and a carriage 3 having an optical servo mechanism and a magnetic head (not shown), which confirms the servo state on the disk-shaped magnetic recording medium 1 by the optical servo mechanism and reads and writes data by the magnetic head. The magnetic disk unit further comprises a carriage moving part 4 such as a voice coil motor or the like which moves the carriage 3 in a unit distance that is shorter than the data track width in response to a position instruction outputted by a CPU 8, where such instruction is based on the servo state that is outputted from the optical servo mechanism of the carriage 3 to the CPU 8. The magnetic disk unit also comprises a magnetic head amplifier 5 for amplifying the data that is read by the magnetic head of the carriage 3, a reproduction output amplitude measuring circuit 6 for measuring the amplitude of the reproduction output of the data amplified by the magnetic head amplifier 5, and an index signal generating circuit 7 which generates an index signal each time the disk-shaped magnetic recording medium 1 is rotated once by the spindle motor 2. The CPU 8 includes a pointer 81 for counting the number of movements of the carriage 3, which is moved by the carriage moving part 4, a reproduction output amplitude memory 82 for storing the value of the reproduction output amplitude measured by the reproduction output amplitude measuring circuit 6 each time the index signal is generated, and a maximum reproduction output amplitude memory 83 for storing the value of the pointer 81 at a position where the maximum reproduction output amplitude is outputted among the measured reproduction output amplitudes. The CPU 8 controls the processing timing of the reproduction output amplitude measured by the reproduction output amplitude measuring circuit 6 on the basis of the index signal that is outputted from the index signal generating circuit 7.

Here, the relationship between the position of the magnetic head of the carriage 3 on the data track of the disk-shaped magnetic recording medium 1 and the reproduction output amplitude at that position will be described with reference to FIG. 2.

Figure 2A:
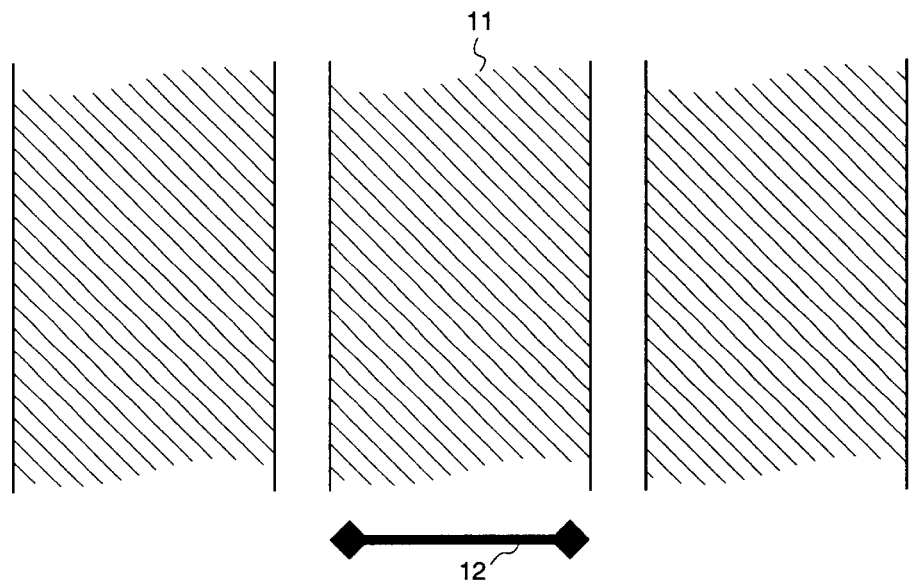
FIG. 2(a) is a diagram illustrating data tracks on a disk-shaped magnetic recording medium and a magnetic head.
Figure 2A:
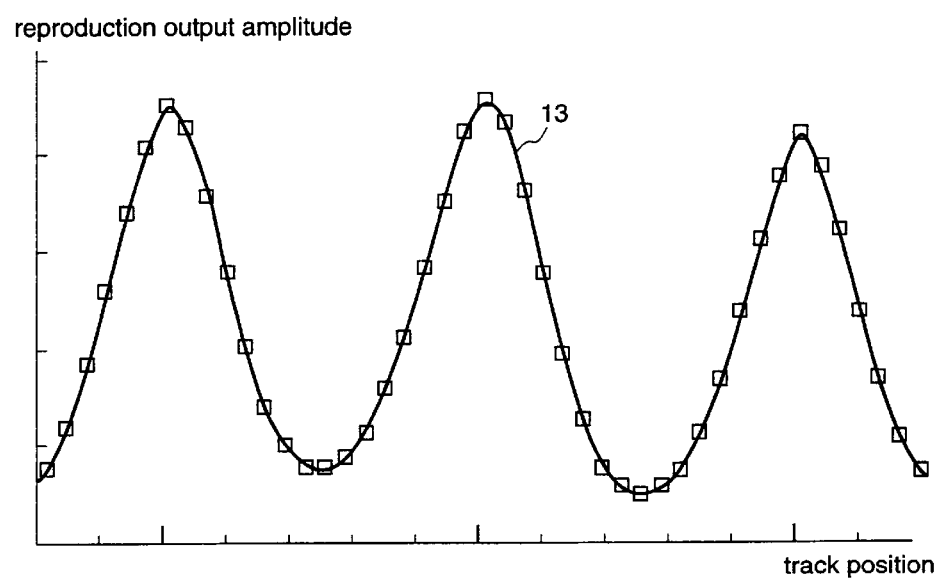

FIG. 2(a) is a diagram illustrating the data tracks on the disk-shaped magnetic recording medium and the magnetic head, and FIG. 2(b) is a diagram illustrating the reproduction output amplitude for each movement of the magnetic head when the magnetic head is slightly moved in the direction of the radius of the disk-shaped magnetic recording medium 1.

As shown in FIGS. 2(a) and (b), the reproduction output amplitude of the data track 11 varies according to the position of the magnetic head 12 on the data track 11, and the reproduction output amplitude has a maximum value when the magnetic head 12 is located in the center of the data track 11 in the radial direction. Therefore, to perform data track positioning of the magnetic head 12 to each data track, the magnetic head 12 should be moved to the position of the maximum reproduction output amplitude, where the reproduction output amplitude 13 shown in FIG. 2(b) has the maximum value.

Hereinafter, the operation for data track positioning by the CPU 8 in the magnetic disk unit according to the first embodiment will be described with reference to a flow chart shown in FIG. 3.

Figure 3:
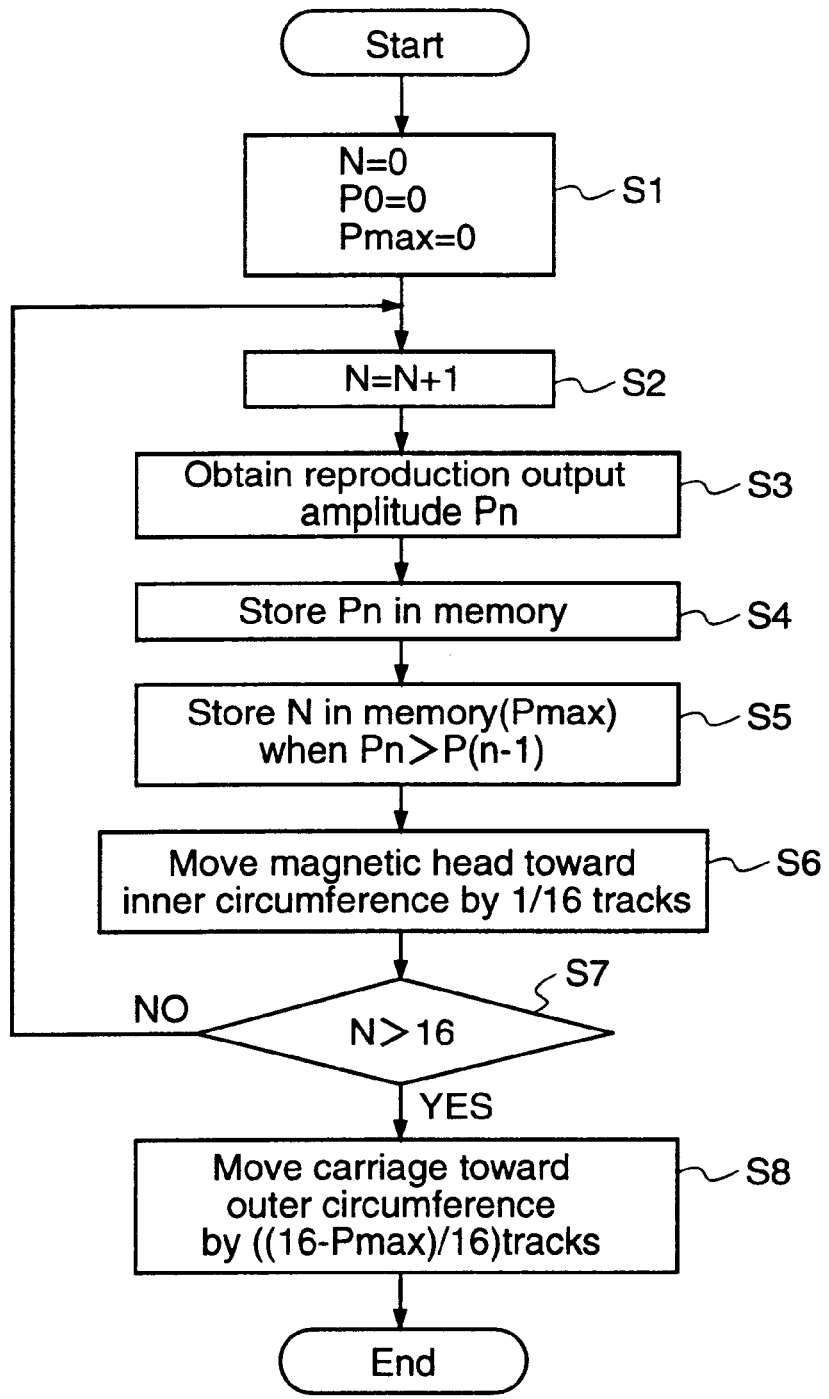
FIG. 3 is a flow chart illustrating a series of flow of a data track positioning operation in the first embodiment.

FIG. 3 is a flow chart illustrating a series of operations for data track positioning in the magnetic disk unit according to the first embodiment of the present invention.

Here, the magnetic head reads data at the present position on the data track 11 with a timing at which the index signal generating circuit 7 of the magnetic disk unit generates the index signal each time the carriage 3 is moved by 1/16 tracks.

First, a value N of the pointer 81, a value Pn of the reproduction output amplitude memory 82, and a value Pmax of the maximum reproduction output amplitude memory 83 are initialized (step S1).

Next, the value N of the pointer 81 is incremented (step S2), the reproduction output amplitude Pn of the data track on which the magnetic head of the carriage 3 is presently located is obtained by the reproduction output amplitude measuring circuit 6 with a timing at which the index signal is generated from the index signal generating circuit 7 (step S3), and the value Pn is stored in the reproduction output amplitude memory 82 (step S4).

Further, when the value Pn of the reproduction output amplitude stored in the reproduction output amplitude memory 82 in step S4 is larger than a value P(n−1) which has just been previously stored, the value N of the pointer 81 at that time is stored in the maximum reproduction output amplitude memory 83 as Pmax (step S5).

Then, an instruction is outputted from the CPU 8 to the carriage moving part 4 so that the carriage 3 is moved toward the inner circumference by a prescribed value, that is, by 1/16 tracks here (step S6), and it is judged whether the present value N of the pointer 81 is greater than 16 or not (step S7), and the processing returns to step S2 when the present value N is equal to or smaller than 16.

When the value N of the pointer 81 is greater than 16, an instruction is outputted from the CPU 8 to the carriage moving part 4 so that the carriage 3 is moved by ((16-Pmax)/16) tracks toward the outer circumference (step S8).

As described above, the magnetic disk unit according to the first embodiment generates the index signal from the index signal generating circuit 7 each time the spindle motor 2 is rotated once, slightly moves, by means of the carriage moving part 4, the magnetic head of the carriage 3 by a prescribed unit interval on the data track 11 in the direction of the radius of the disk-shaped magnetic recording medium 1, measures the reproduction output amplitude Pn in the reproduction output amplitude measuring circuit 6 each time the index signal is generated, holds the position Pmax on the data track 11 where the reproduction output amplitude Pn has the maximum value, and moves the magnetic head of the carriage 3 to the held position Pmax after the magnetic head is moved by a prescribed distance. Therefore, a short-time and more accurate data track positioning can be performed so as to reproduce data without having to perform the initial operation of moving the magnetic head to the reference track, which has conventionally been performed every time the disk-shaped recording medium 1 is exchanged.

While, the disk-shaped magnetic recording medium 1 has optical grooves sandwiching each data track and the carriage 3 is provided with an optical track servo mechanism in the first embodiment, a disk-shaped recording medium with no optical grooves, such as a floppy disk, can also achieve the same effects as mentioned above.

While, the index signal is generated each time the disk-shaped magnetic recording medium 1 is rotated once by the spindle motor 2 in the first embodiment, the index signal may be generated at any interval or position.

Second Embodiment

Hereinafter, the positioning of a magnetic head of a magnetic disk unit according to a second embodiment of the present invention will be described with reference to FIGS. 4 to 5. In this second embodiment, reference track positioning on a disk-shaped magnetic recording medium will be described.

Figure 4:
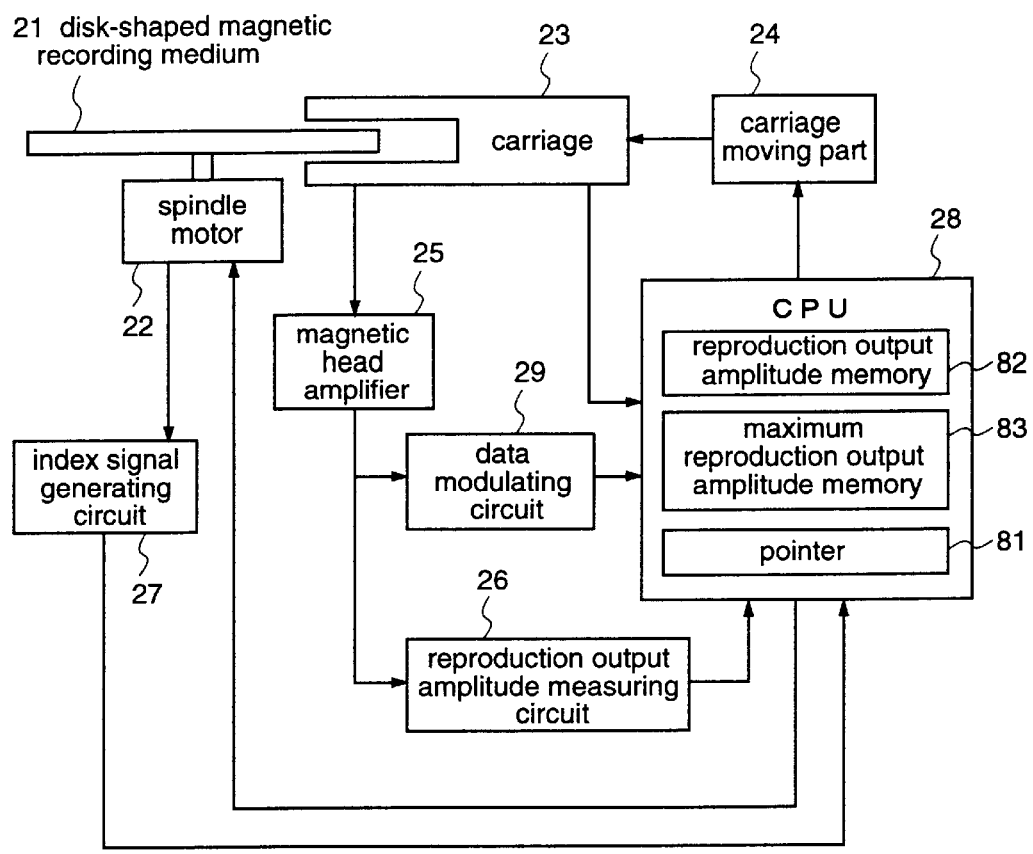
FIG. 4 is a diagram illustrating the constitution of a magnetic disk unit according to a second embodiment of the present invention.

FIG. 4 is a diagram illustrating the constitution of the magnetic disk unit according to the second embodiment of the present invention. The second embodiment will be described based on the assumption that the disk-shaped magnetic recording medium has optical grooves and that the magnetic disk unit performs a servo operation by an optical laser, as in the first embodiment.

In FIG. 4, the magnetic disk unit according to the second embodiment comprises a disk-shaped magnetic recording medium 21 having a reference track in a part of the disk-shaped recording medium 21, plural data tracks, and optical grooves that are sandwiched between the respective data tracks. The magnetic disk unit of the second embodiment also comprises a spindle motor 22 for rotating the disk-shaped magnetic recording medium 21 and a carriage 23 having an optical servo mechanism and a magnetic head (not shown), which confirms the servo state on the disk-shaped magnetic recording medium 21 by the optical servo mechanism and reads and writes data by the magnetic head. The magnetic disk unit of the second embodiment further comprises a carriage moving part 24 such as a voice coil motor or the like which moves the carriage 23 in a unit distance that is shorter than the data track width in response to a position instruction outputted by a CPU 28, where such instruction is based on the servo state that is outputted from the optical servo mechanism of the carriage 23 to the CPU 28. The magnetic disk unit of the second embodiment also comprises a magnetic head amplifier 25 for amplifying the data that is read by the magnetic head of the carriage 23, a reproduction output amplitude measuring circuit 26 for measuring the amplitude of the reproduction output of the data amplified by the magnetic head amplifier 25, and an index signal generating circuit 27 which generates an index signal each time the disk-shaped magnetic recording medium 21 is rotated once by the spindle motor 22. The CPU 28 includes a pointer 81 for counting the number of movements of the carriage 23, which is moved by the carriage moving part 24, a reproduction output amplitude memory 82 for storing the value of the reproduction output amplitude measured by the reproduction output amplitude measuring circuit 26 each time the index signal is generated, and a maximum reproduction output amplitude memory 83 for storing the value of the pointer 81 at a position where the maximum reproduction output amplitude is outputted among the measured reproduction output amplitude. The CPU 28 controls the timing for processing the reproduction output amplitude in the reproduction output amplitude measuring circuit 26 on the basis of the amplitude of the reproduction output that is measured by the reproduction output amplitude measuring circuit 26 and the index signal that is generated by the index signal generating circuit 27. The magnetic disk unit of the second embodiment also comprises a data demodulating circuit 29 for demodulating sector information of a data track from the data amplified by the magnetic head amplifier 25.

Hereinafter, the operation for reference track positioning by the CPU 28 in the magnetic disk unit according to the second embodiment will be described with reference to a flow chart in FIG. 5.

Figure 5:
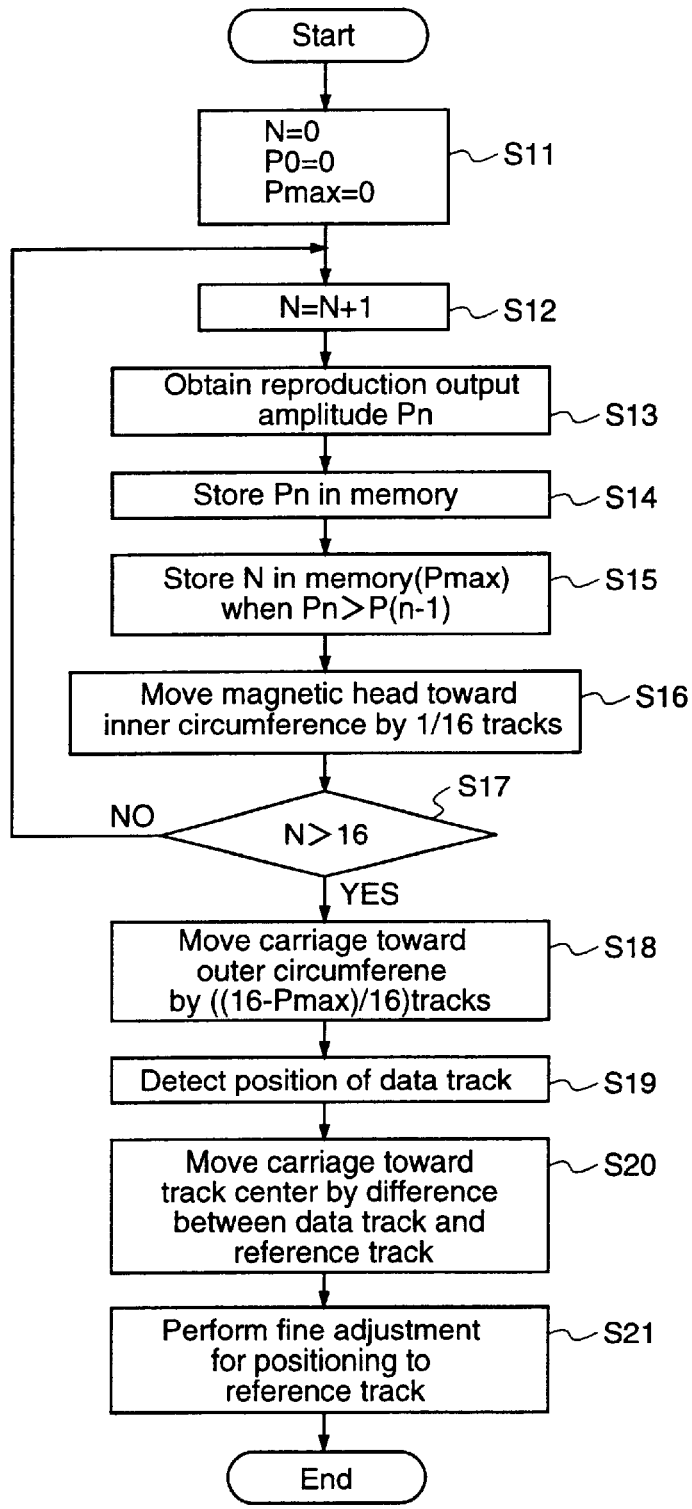
FIG. 5 is a flow chart illustrating a series of flow of a reference track positioning operation in the second embodiment.

FIG. 5 is a flow chart illustrating a series of operations for reference track positioning in the magnetic disk unit according to the second embodiment of the present invention.

Here, as in the first embodiment, the magnetic head reads data at the present position on the data track 11 with a timing at which the index signal generating circuit 27 generates the index signal each time the carriage 23 of the magnetic disk unit of the second embodiment is moved by 1/16 tracks.

First, a value N of the pointer 81, a value Pn of the reproduction output amplitude memory 82, and a value Pmax of the maximum reproduction output amplitude memory 83 are initialized (step S11).

Next, the value N of the pointer 81 is incremented (step S12), the reproduction output amplitude Pn of the data track on which the magnetic head of the carriage 23 is presently located is obtained by the reproduction output amplitude measuring circuit 26 with a timing at which the index signal is generated (step S13), and the value Pn is stored in the reproduction output amplitude memory 82 (step S14).

Further, when the value Pn of the reproduction output amplitude stored in the reproduction output amplitude memory 82 in step S14 is larger than a value P(n−1) which has just been previously stored, the value N of the pointer 81 at that time is stored in the maximum reproduction output amplitude memory 83 as Pmax (step S15).

Then, an instruction is outputted from the CPU 28 to the carriage moving part 24 so that the carriage 23 is moved toward the inner circumference by a prescribed value, that is, by 1/16 tracks here (step S16), and it is judged whether the present value N of the pointer 81 is greater than 16 or not (step S17), and the processing returns to step S12 when the present value N is equal to or smaller than 16.

When the value N of the pointer 81 is greater than 16, an instruction is outputted from the CPU 28 to the carriage moving part 24 so that the carriage 23 is moved by ((16−Pmax)/16) tracks toward the outer circumference (step S18).

After the magnetic head of the carriage 23 is positioned on a data track at the position of the maximum reproduction output amplitude as shown in FIG. 2(b) by the carriage moving part 24, sector information of the data track on which the magnetic head is positioned is read by the data demodulating circuit, and position information of the data track is detected (step S19). Then, a relative positional difference between the data track position information and the reference track position, such as, for example, the amount that is obtained by subtracting the present data track number from the last track number, is calculated, and an instruction is outputted from the CPU 28 to the carriage moving part 24 so that the carriage 23 is moved toward the inner circumference by the calculated amount (step S20). By this calculation, accurate coarse adjustment to the reference track position can be performed, whereby the positional range of reference track detection at the subsequent fine adjustment can be narrowed. After the coarse adjustment to the reference track position in step S20, the fine adjustment for reference track positioning is performed (step S21).

As described above, the magnetic disk unit according to the second embodiment generates the index signal each time the spindle motor 22 is rotated once, slightly moves, by means of the carriage moving part 24, the magnetic head of the carriage 23 in the direction of the radius of the disk-shaped magnetic recording medium 21, detects a position of the maximum reproduction output amplitude of the data track based on the reproduction output amplitude measured with a timing at which the index signal is generated each time the carriage 23 is moved, performs accurate positioning to the data track based on the position of the maximum output amplitude, and performs positioning to the reference track based on the sector information that is demodulated at the data track positioning. Therefore, the positional range of reference track detection at fine adjustment for positioning the magnetic head is narrowed, thereby resulting in a short-time and accurate reference track positioning.

While, the disk-shaped magnetic recording medium 21 has optical grooves sandwiching each data track and the carriage 23 is provided with an optical track servo mechanism in the second embodiment, a disk-shaped recording medium having no optical grooves, such as a floppy disk, can also achieve the same effect as mentioned above.

While, the index signal is generated each time the disk-shaped magnetic recording medium 1 is rotated once by the spindle motor 2 in the second embodiment, the index signal may be generated at any interval or position.

A magnetic disk unit according to the present invention is useful for performing data track positioning of a magnetic head to each data track or for accurate reference track positioning of the magnetic head to a reference track on a disk-shaped magnetic recording medium in a short amount of time.

What is claimed is:

1. A magnetic disk unit which rotates a disk-shaped magnetic recording medium having a reference track and plural data tracks with a motor which generates an index signal at a predetermined position, and which records or reproduces data by employing a magnetic head, said magnetic disk unit comprising:

a head moving means for slightly moving the magnetic head in the direction of the radius of the disk-shaped magnetic recording medium in a predetermined unit of a distance that is shorter than the data track width;

a reproduction output amplitude measuring means for measuring the reproduction output amplitude of a signal read from a data track on the disk-shaped magnetic recording medium by the magnetic head every time the index signal is generated; and a CPU operable to obtain a position where the reproduction output amplitude has the maximum value based on the reproduction output amplitude measured by said reproduction output amplitude measuring means and the number of head movements of the magnetic head as moved by said head moving means so as to perform control of data track positioning of the magnetic head on the data track.

2. A magnetic disk unit which rotates a disk-shaped magnetic recording medium having a reference track, plural data tracks and optical grooves sandwiched between the respective data tracks with a motor which generates an index signal at a predetermined position, and which records or reproduces data by employing a magnetic head, said magnetic disk unit comprising:

a head moving means for slightly moving the magnetic head in the direction of the radius of the disk-shaped magnetic recording medium in a predetermined unit of a distance that is shorter than the data track width;

a reproduction output amplitude measuring means for measuring the reproduction output amplitude of a signal read from a data track on the disk-shaped magnetic recording medium by the magnetic head every time the index signal is generated; and a CPU operable to obtain a position where the reproduction output amplitude has the maximum value based on the reproduction output amplitude measured by said reproduction output amplitude measuring means and the number of head movements of the magnetic head as moved by said head moving means so as to perform control of data track positioning of the magnetic head on the data track.

3. The magnetic disk unit as defined in claim 1, further including a track position detecting means for detecting the data track position from the signal read from the data track by the magnetic head, wherein said CPU is operable to calculate a relative positional difference between the data track position detected by said track position detecting means and the reference track position, and to perform control of reference track positioning of the magnetic head on the basis of the calculation result.

4. The magnetic disk unit as defined in claim 1, wherein:

the data track positioning control performed by said CPU holds the head moving cycle number, the value of the reproduction output amplitude which is measured by said reproduction output amplitude measuring means at the head moving cycle number every time the index signal is generated, and the maximum reproduction output amplitude cycle number which is the moving cycle number having a larger reproduction output amplitude when compared between the measured reproduction output amplitude and the reproduction output amplitude at the immediately previous moving cycle number; and after performing processing corresponding to a predetermined number of moving cycle numbers by said CPU, a position of the maximum reproduction output amplitude on the data track is obtained on the basis of the maximum reproduction output amplitude cycle number, and the obtained position is set as a data track position of the magnetic head on the data track.

5. The magnetic disk unit as defined in claim 4, further including a track position detecting means for detecting the data track position from the signal read from the data track by the magnetic head, wherein said CPU is operable to calculate a relative positional difference between the data track position detected by said track position detecting means and the reference track position, and to perform control of reference track positioning of the magnetic head on the basis of the calculation result.

6. The magnetic disk unit as defined in claim 2, further including a track position detecting means for detecting the data track position from the signal read from the data track by the magnetic head, wherein said CPU is operable to calculate a relative positional difference between the data track position detected by said track position detecting means and the reference track position, and to perform control of reference track positioning of the magnetic head on the basis of the calculation result.

7. The magnetic disk unit as defined in claim 2, wherein:

the data track positioning control performed by said CPU holds the head moving cycle number, the value of the reproduction output amplitude which is measured by said reproduction output amplitude measuring means at the head moving cycle number every time the index signal is generated, and the maximum reproduction output amplitude cycle number which is the moving cycle number having a larger reproduction output amplitude when compared between the measured reproduction output amplitude and the reproduction output amplitude at the immediately previous moving cycle number; and after performing processing corresponding to a predetermined number of moving cycle numbers by said CPU, a position of the maximum reproduction output amplitude on the data track is obtained on the basis of the maximum reproduction output amplitude cycle number, and the obtained position is set as a data track position of the magnetic head on the data track.

8. The magnetic disk unit as defined in claim 7, further including a track position detecting means for detecting the data track position from the signal read from the data track by the magnetic head, wherein said CPU is operable to calculate a relative positional difference between the data track position detected by said track position detecting means and the reference track position, and perform control of reference track positioning of the magnetic head on the basis of the calculation result.

* * * * *